United States Patent
Reeder et al.

(10) Patent No.: US 7,376,160 B2
(45) Date of Patent: May 20, 2008

(54) SLAB LASER AND METHOD WITH IMPROVED AND DIRECTIONALLY HOMOGENIZED BEAM QUALITY

(75) Inventors: Robin A. Reeder, El Segundo, CA (US); David M. Filgas, Newbury Park, CA (US); Robert W. Byren, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 543 days.

(21) Appl. No.: 10/720,328

(22) Filed: Nov. 24, 2003

(65) Prior Publication Data

US 2005/0111496 A1    May 26, 2005

(51) Int. Cl.
*H01S 3/10* (2006.01)
(52) U.S. Cl. .............................. 372/9; 372/92
(58) Field of Classification Search .............. 372/92
See application file for complete search history.

(56) References Cited

U.S. PATENT DOCUMENTS 3,924,201 A * 12/1975 Crow ...................... 372/108
5,199,042 A    3/1993 Papetti et al.
2002/0181534 A1   12/2002 Hodgson et al.
2003/0128732 A1*   7/2003 Ishizu ......................... 372/75
2003/0160034 A1    8/2003 Filgas et al.
2003/0161375 A1    8/2003 Filgas

FOREIGN PATENT DOCUMENTS

| EP | 1 335 459 |   | 8/2003 |
| JP | 06037368 A | * | 2/1994 |
| JP | 06-0373 | * | 10/1994 |
| JP | 06-037368 | * | 10/1994 |
| WO | WO97/14200 |   | 4/1997 |
| WO | WO97/14200 |   | 7/2001 |

* cited by examiner

*Primary Examiner*—Dung T. Nguyen
(74) *Attorney, Agent, or Firm*—Leonard A. Alkov

(57) ABSTRACT

A laser resonator for generating a laser beam having beam quality along two transverse axes that is determined primarily by the mode discrimination characteristics of one axis. The apparatus including a means for providing a collimated beam of electromagnetic energy with a predetermined orientation with respect to a line of sight thereof, and, a means for rotating the beam such that a transverse mode selection therefor is the same for two orthogonal directions thereof.

30 Claims, 3 Drawing Sheets

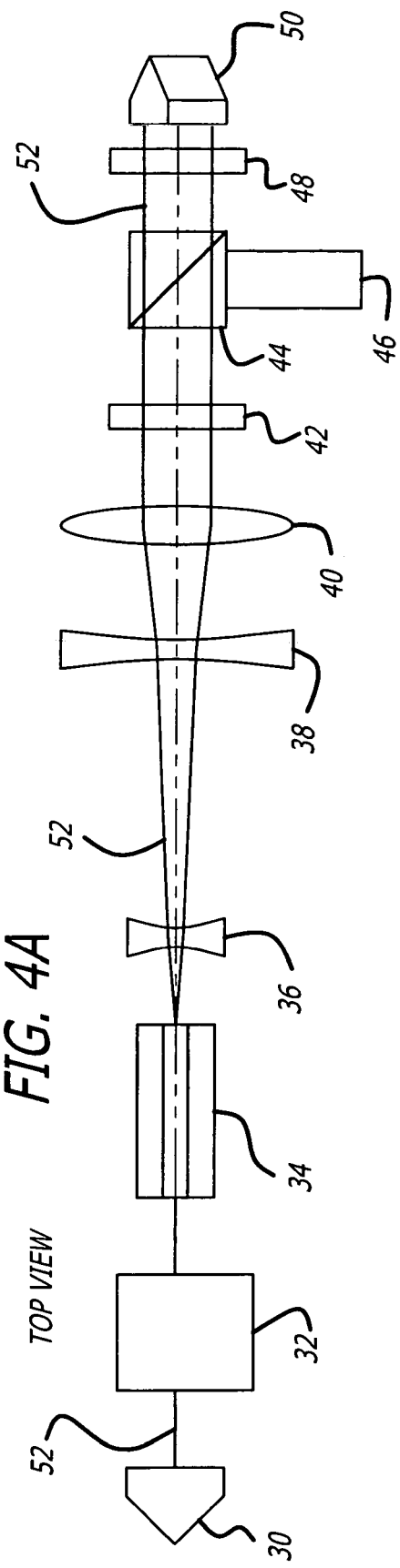
FIG. 4A TOP VIEW
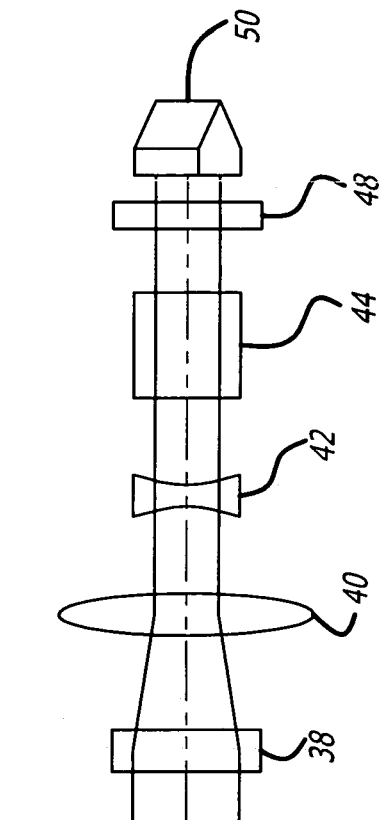
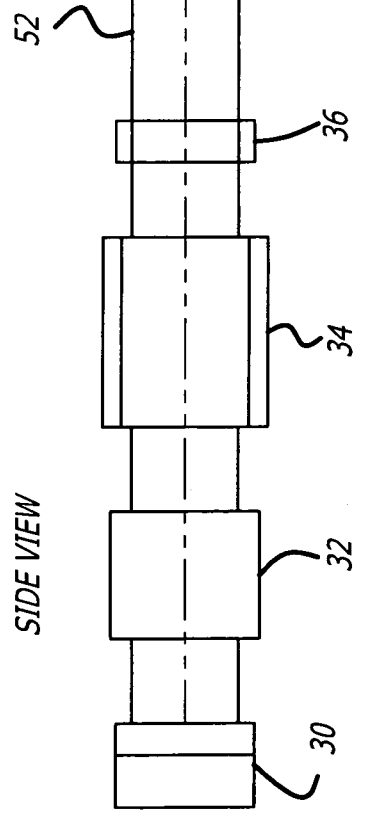
FIG. 4B SIDE VIEW

SLAB LASER AND METHOD WITH IMPROVED AND DIRECTIONALLY HOMOGENIZED BEAM QUALITY

BACKGROUND OF THE INVENTION

1. Field of the Invention

The present invention relates to lasers. More specifically, the present invention relates to solid-state slab lasers having high beam quality along orthogonal transverse axes.

2. Description of the Related Art

Solid-state lasers are useful in a number of military and commercial applications. Many applications require high output power levels and high beam quality in order to achieve adequate beam intensity on a target in the far field. Some of these applications also require short duration pulses, which may fall into the nanosecond range. Military applications include rangefinders, designators, active tracking illuminators, beacons for atmospheric wavefront sensing, laser radar, infrared countermeasures, and directed energy weapons. Commercial applications include industrial materials processing, long-range remote sensing, and other scientific applications. Solid state lasers employ a doped insulator lasing medium that can be configured into shapes such as cylindrical rods and rectangular solids. Cylindrical rod lasers are particularly useful, but have limited scalability for a variety of reasons, including thermal management limitations.

One approach to scaling solid-state lasers to higher power levels involves using a high aspect ratio rectangular slab lasing medium geometry. The high aspect ratio slab geometry provides a larger cooling surface relative to a cylindrical rod of equal volume. Further, the heat flow within the slab is essentially one-dimensional and is spread over a large area; therefore the temperature gradient is small relative to the rod and is also one-dimensional. Because the stress within the slab follows the temperature gradient, stress-induced birefingence tends to be along the normal to the broad slab surfaces and light polarized in this direction, or an orthogonal direction, will not be depolarized when propagated through the slab. The thermal lensing effect present in a slab medium is cylindrical and can be compensated by propagating the beam in a zigzag path between the broad slab surfaces.

Conventional high aspect ratio slab laser resonators typically exhibit different beam quality in the two transverse dimensions that are oriented along directions corresponding with the wide and narrow axes of the slab. This is because the slab laser operates with a different resonator configuration along the wide axis, as compared to the narrow axis of the slab. A simple stable laser resonator system built around a high aspect ratio slab lasing medium can be easily designed so that the narrow axis produces single transverse electromagnetic (TEM) mode performance. However, the wider axis typically produces multi-mode beam quality unless a more complex resonator design is used in this axis. Accordingly, for typical stable resonators, a low Fresnel number is present along the narrow, single mode, axis and a larger Fresnel number for the wide slab axis. The laser therefore produces poor beam quality along the wide axis of the slab.

Low-order transverse mode operation along the wider slab axis has been achieved in the prior art. This is accomplished in a stable laser resonator by providing a limiting aperture sized to achieve a low Fresnel number within the system. Intra-cavity telescopes are sometimes used in laser resonators to demagnify the limiting aperture and reduce the effective Fresnel number. Because a high aspect ratio laser slab is broader in one transverse dimension, achieving low Fresnel number operation along the wide direction requires a physically long resonator length. This approach has two fundamental disadvantages. First, the long length of the resonator results in a large physical volume for the laser resonator. Second, the buildup time in a long resonator is slower, leading to long duration Q-switched pulses. Furthermore, because the transverse mode selection for the two orthogonal directions is decoupled, the resonator may produce a beam with a different beam quality in each direction, which is undesirable in certain applications.

A low order mode in the broad dimension of the slab can also be achieved using an unstable resonator configuration, in which the out-coupling is achieved, for example, by varying the reflectivity of an out-coupler mirror across the transverse dimension. Other structure in the lasing cavity can be used to correct beam quality as well. A gaussian reflector can be used to reduce higher order TEM modes of the beam. The unstable resonator approach cannot be used with cavity dumping, and thereby limits its utility for certain pulsed applications of interest, such as short-duration pulsed systems.

Thus, there is a need in the art for a laser resonator that produces uniformly high beam quality in both transverse dimensions with a compact high aspect slab lasing medium that also addresses the problem of generating short-duration Q-switched pulses in a low-Fresnel number resonator, where the length of the resonator is determined by mode discrimination associated with the narrow dimension of the high-aspect slab.

SUMMARY OF THE INVENTION

The need in the art is addressed by the apparatus and methods of the present invention. An apparatus including a means for providing a collimated beam of electromagnetic energy with a predetermined orientation with respect to a line of sight thereof, and, a means for rotating the beam such that a transverse mode selection therefor is the same for two orthogonal directions thereof is taught.

In a specific embodiment of the foregoing apparatus, the first means includes a slab laser having principal axes. In another specific embodiment, the second means includes a porro prism or a Benson prism. In another embodiment, the prism is rotated 45 degrees about the line of sight with respect to the slab axes. In another embodiment, the beam is rotated through two successive round trip passes through the slab. In another embodiment, the apparatus further includes a telescope. In another embodiment, the telescope is an anamorphic telescope. In another embodiment, the telescope is disposed between the slab and the prism.

In a separate embodiment, a laser resonator apparatus for generating a laser beam having beam quality along two transverse axes that is determined by the mode discrimination characteristics of one axis is taught. The laser resonator includes a slab lasing medium that has a first and a second end for emitting a laser beam. The resonator also includes an aperture stop with a narrow transverse dimension and an orthogonal wide transverse dimension for defining a beam profile of the laser beam. A first reflector is aligned to reflect the laser beam emitted from the first end of the slab back therein, and thereby defines a first end of a resonant cavity. An anamorphic telescope having a first end is aligned to receive the laser beam emitted from the second end of the slab. The telescope operates to reshape the laser beam profile to be substantially symmetrical about its transverse axes and then emits the reshaped laser beam from a second end of the telescope. A second reflector is aligned to receive the reshaped laser beam, and operates to rotate the beam profile of the reshaped laser beam by 90° and to reflect the laser beam back into the second end of the telescope. This defines a second end of the resonant cavity.

In specific embodiments of the present invention, the first reflector is a porro (or roof) prism, a Benson prism, a mirror, or a resonant reflector. The second reflector is a porro prism or a Benson prism having its roof-line rotated approximately 45° with respect to the narrow and wide transverse dimensions of the laser beam. In other embodiments, the second reflector is a mirror or other reflector element that does not rotate the beam and a separate optical rotator element is disposed between the second reflector and the anamorphic telescope which rotates the beam 90° after passing through the rotator element, reflecting off the non-rotating reflector, and again passing through the rotating element in the opposite direction. The separate optical rotator element may be a dove prism, Pechan prism or other image rotator element known in the art. The aperture stop may be defined by the transverse dimensions of the slab or the active region of a composite slab structure, or may be a mechanical aperture stop positioned along the path of the laser beam. In a specific embodiment, the aperture stop is positioned substantially closer to the first reflector than to the second reflector. In another embodiment, the telescope is positioned substantially closer to the second reflector than to the aperture stop.

In another specific embodiment, the resonator further includes a half-wave plate positioned between the slab and a porro prism, which serves as the second reflector. The slab may be a solid-state lasing medium, and may be ytterbium ion doped yttrium-aluminum-garnet. In a refinement of the laser resonator apparatus, a separate output-coupler or out-coupler is added, which may be a polarization out-coupler.

In yet another specific embodiment, the resonator further includes an optical switch aligned along the path of the laser beam. The optical switch allows the resonator to operate in a pulsed output mode either by Q-switching, longitudinal mode-locking, or cavity dumping, or a combination of the aforementioned techniques, all known in the art. The optical switch may be a voltage-driven nonlinear electro-optic switch such as a Pockels cell and or an acousto-optic switch or other optical switching apparatus known in the art.

The present invention also teaches a method of generating a laser beam having beam quality along two transverse axes that is determined by the mode discrimination characteristics of one axis. This method is accomplished in a laser resonator having a slab lasing medium, an aperture stop, a first reflector aligned with a first end of the slab, an anamorphic telescope aligned with a second end of the slab, and a second reflector aligned with the telescope opposite of the slab. The steps of the method include stimulating emission of a laser beam from the ends of the slab, and limiting the profile of the laser beam by a narrow transverse dimension and an orthogonal wide transverse dimension of the aperture stop. Then reflecting, by the first reflector, the laser beam emitted from the first end of the slab back therein, thereby defining a first end of a resonant cavity. Next, reshaping the laser beam profile, by the telescope, to be substantially symmetrical about its transverse axes. Finally, rotating the beam profile of the reshaped laser beam by approximately 90°, by the second reflector, and reflecting the reshaped laser beam back into the telescope, by the second reflector, thereby defining a second end of the resonant cavity.

In a specific embodiment of the foregoing method, the first reflector may be a porro prism, a Benson prism, a mirror, or a resonant reflector. The second reflector may be a porro prism or a Benson prism having its roof-line rotated approximately 45° with respect to the narrow and wide transverse dimensions of the laser beam. In other embodiments, the second reflector may be a mirror or other reflector element that does not rotate the beam and a separate optical rotator element is disposed between the second reflector and the anamorphic telescope which rotates the beam 90° after passing through the rotator element, reflecting off the non-rotating reflector, and again passing through the rotating element in the opposite direction. The separate optical rotator element may be a dove prism, Pechan prism or other image rotator element known in the art. The aperture stop may be defined by the transverse dimensions of the slab or by a mechanical aperture stop positioned along the path of the laser beam. In another embodiment, the method includes the further step of positioning the aperture stop substantially closer to the first reflector than to the second reflector. In another embodiment, the method includes the further step of positioning the telescope substantially closer to the second reflector than to the aperture stop. In a particular embodiment, the method includes the further step of retarding the phase between the orthogonal beam polarizations by a half wave with a half-wave plate positioned between the anamorphic telescope and the second reflector. The laser slab may be a solid-state lasing medium. The out-coupling step may be accomplished with a partially-transmitting mirror, polarization out-coupler, or an unstable resonator configuration.

In yet another specific embodiment of the foregoing method, the resonator further includes an optical switch aligned along the path of the laser beam. The optical switch allows the resonator to operate in a pulsed output mode either by Q-switching, longitudinal mode-locking, or cavity dumping, or a combination of the aforementioned switching methods, all known in the art. The optical switch may be a voltage-driven nonlinear electro-optic switch such as a Pockels cell and or an acousto-optic switch or other optical switching apparatus known in the art.

BRIEF DESCRIPTION OF THE DRAWINGS

FIG. 4 is a drawing of a laser resonator employing a slab lasing medium, a 45° rotated porro prism and an intra-cavity telescope according to an illustrative embodiment of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The teachings of the present invention are applicable to a broad range of applications requiring high power solid-state laser resonators with good beam quality in both transverse axes. It is particularly useful in applications requiring short pulse duration operation with high beam quality. Conventional high aspect ratio slab laser resonators typically exhibit different beam quality along the two transverse slab dimensions. The present invention applies image rotation within the resonator to produce a laser beam with low Fresnel number propagation characteristics by homogenizing the beam quality in the transverse directions after two or more successive round trip passes in the laser resonator cavity. This approach has two attractive features, which are (1) a highly uniform beam that is generated with an arbitrarily high aspect slab medium and, (2) high beam quality that is achieved in both directions with a short resonator, as used to produce Q-switched pulses of short duration.

Low-order transverse mode operation has been achieved in prior art laser resonators by providing a limiting aperture stop in the resonator beam path that is sized to achieve a low Fresnel number. Intra-cavity telescopes are also known in the prior art and are used to de-magnify the limiting aperture and reduce the effective Fresnel number. Since a high-aspect ratio laser slab is broader in one transverse dimension, achieving low Fresnel number operation along this direction has required a long resonator length. A low order mode in the broad dimension of the slab has also been achieved in the prior art by using an unstable resonator configuration. In such a configuration, the out-coupling may be achieved by adjusting the effective magnification and attendant size of the powered reflector elements or by varying the reflectivity of an out-coupler mirror across the transverse dimension. However, the unstable resonator approach cannot be used with cavity dumping configurations and therefore limits the utility of the approach for certain short duration pulse applications.

Figure 1:
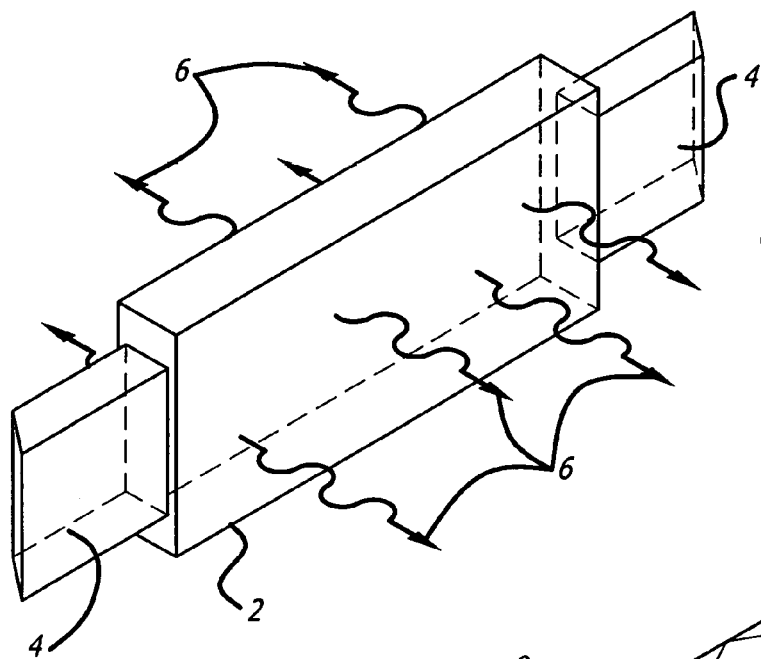
FIG. 1 is a drawing of a prior art high aspect ratio rectangular slab solid-state laser.

Reference is directed to FIG. 1 which is a drawing of a prior art high aspect ratio rectangular slab 2 solid-state lasing medium. This configuration is used for the aforementioned power scaling design approach. As shown in FIG. 1, the slab 2 geometry provides a large cooling surface. The system is designed to extract waste heat 6 from the broad slab 2 surfaces. The laser beam 4 is established to propagate along the longitudinal axis of the slab 2 and through the smaller ends of the slab 2, as shown. Generally, the profile of the beam follows the profile of the narrow and wide transverse dimension of the slab 2. The heat flow 6 within the slab is essentially one dimensional and is spread over a large area, therefore the temperature gradient is small and is also one dimensional. Because the stress within the slab follows the temperature gradient, the stress-induced birefingence tends to be along the normal to the broad slab surfaces and light polarized in this direction or an orthogonal direction will not be depolarized when propagated through the slab.

Figure 2:
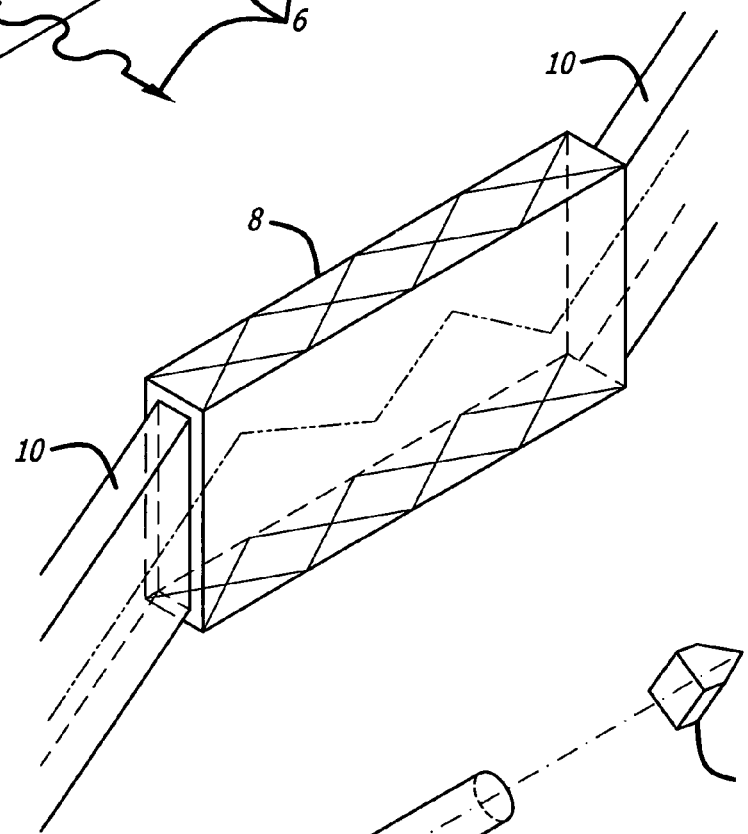
FIG. 2 is a drawing of a high aspect ratio rectangular slab illustrating a zigzag beam path through the medium according to an illustrative embodiment of the present invention.

Thermal lensing in the slab 2 is substantially cylindrical and can be largely compensated by propagating the beam in a zigzag path between the broad slab surfaces. Reference is directed to FIG. 2, which illustrates the approach of propagating the laser beam 10 along a zigzag path 10 through the slab 8. The theory of operation and limitations of the zigzag slab design approach are known to those skilled in the art, and are not repeated herein.

The present invention teaches the rotation of the laser beam spatial profile between successive round-trip passes through the resonator cavity. By rotating the beam in this way, the transverse mode discrimination is the same for the two orthogonal directions. The beam quality for both transverse directions is determined by the preferable mode discrimination characteristics of the narrow dimension of the slab, or aperture stop, and therefore can produce high beam quality in both transverse directions without requiring a physically long resonator. Also, the short resonator allows rapid buildup of the laser pulse in a Q-switched configuration resulting in desirable short-duration pulses. In an illustrative embodiment of the present invention, a porro prism having its roof line rotated 45° with respect to the slab transverse axes is used to induce the 90° spatial profile rotation while at the same time reflect the beam back toward the slab. Other optical elements and groups of elements can achieve the same effect, and are suitable for application in the present invention. The Benson prism is clearly applicable. So too, is a pair of mirrors arranged at 90° angles and positioned to retro-reflect the laser beam about a single axis. Other optical apparatus are known to the skilled in the art to achieve the desired spatial profile rotation and reflection. What is important is that the beam spatial profile is rotated approximately 90° so that the vertical becomes horizontal and the horizontal becomes vertical as the beam is reflected.

Certain uses of porro prisms are known in the art, however, the application of porro prisms deployed in an apparatus and method to achieve the beneficial beam homogenization of the present invention is heretofore unknown. Those skilled in the art will be aware that prior art lasers have been designed with porro prisms, roof prisms, Benson prisms, and or corner cube reflectors to minimize the sensitivity of the laser output to misalignment or vibration in one or two axes. The porro, or roof, prism is insensitive to misalignment when rotated about the fold axis. The Benson prism, which combines a porro prism and a 90° reflecting prism in a single element, provides similar misalignment insensitivity while preserving the incident beam polarization. The corner cube is insensitive to misalignment when rotated about either axis orthogonal to the retro-reflection direction. Crossed porro and Benson prisms have been used in prior art rod laser resonators to provide alignment insensitivity about both axes. Because the beam profile is flipped by the fold, radial asymmetries in the resonator optics and in the rod gain medium are homogenized on successive passes, leading to more uniform beam profiles in the near and far field. Such a "crossed-porro" approach is particularly advantageous when used with a pockels-cell Q-switch and polarization output coupler.

Figure 3:
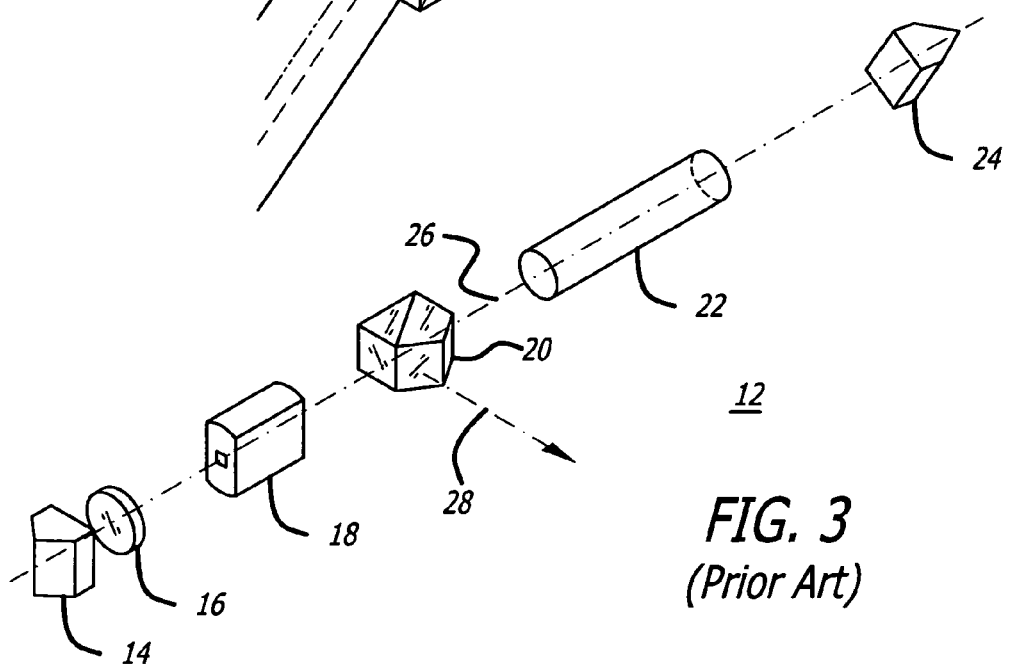
FIG. 3 is a perspective drawing of a prior art solid-state rod laser resonator system.

Reference is directed to FIG. 3, which is a diagram of a crossed-porro laser resonator with polarization output coupling. A rod-shaped lasing medium 22 is positioned along the beam axis 26 within a resonant cavity defined by a first porro prism 14 and a second, crossed, porro prism 24. With such an arrangement, the output coupling fraction is readily controlled by rotating the second porro prism 24. A wave plate 16 is used to manage beam polarization and an electro-optic Q-switch 18 is used to activate beam output 28. Beam output 28 is achieved by varying the beam polarization with Q-switch 18 thus enabling partial or complete beam output by the polarization out-coupler 20. Such arrangements as shown in FIG. 3 are known to those skilled in the art.

As noted above, the standard technique used in the prior art to achieve high beam quality in a stable laser resonator configuration is to place a limiting aperture stop within the resonator that is lossy for high-order transverse modes. The parameter used to quantify the transverse mode discrimination in a resonator is the Fresnel number. The Fresnel number is given by:

$$N = a^2/\lambda L \qquad [1]$$

where: N=Fresnel number,
a=diameter of limiting aperture,
λ=wavelength of laser light, and
L=optical length of laser cavity.

If the Fresnel number is high, the higher-order modes are less loss and able to achieve the threshold condition for lasing. The resultant beam quality of such a multi-transverse-mode laser is therefore poor. If the Fresnel number is very low, even the lowest-order modes experience high loss and the system may not lapse, resulting in no laser output. Typically, lasers operating exclusively in the lowest-order $TEM_{00}$ mode will have Fresnel numbers in the 0.5 to 2.0 range. With respect to rectangular cross section slabs, the length of the cavity and size of the aperture opening are selected to yield single mode performance along the narrow slab dimension. The performance of the wide dimension degrades as the square of the ratio of widths, which can be corrected by greatly extending the length of the cavity.

An illustrative embodiment of the present invention uses a porro prism or Benson prism in conjunction with a slab laser medium within a laser resonator to homogenize the beam spatial profile in the near and far field. This illustrative embodiment also takes advantage of the low Fresnel number in the narrow dimension of the slab to improve the beam quality in both transverse beam directions. Generally, the transverse principal dimensions and axes of the slab and those of the beam are assumed to align and correspond, and are used interchangeably in this disclosure. A drawing of such an embodiment is depicted in FIG. 4, which is taken from both a top view and a side view orientation of the beam path. A high aspect ratio slab of ytterbium ion doped yttrium-aluminum-garnet ("Yb:YAG") 34 is disposed along the beam longitudinal axis 52 within the resonator. The slab 34, which is side pumped or end pumped with indium gallium arsenide (InGaAs) laser diodes (not shown), serves as the laser gain medium. An intra-cavity anamorphic telescope, consisting of optical elements 38, 40, and 42, expands the beam 52 along the narrow dimension and compresses the beam along the wide dimension of the slab. The design and implementation of an anamorphic telescope is known to those skilled in the art, and readily implementable once the parameters are defined. The expansion and compression of the beam 52 are applied such that the beam is symmetrical about both transverse dimensions as it enters the first porro prism 50. The telescope 38, 40, 42 is located at some distance from the limiting aperture of the slab in order to minimize the Fresnel number of the resonator. Those skilled in the art will appreciate that a resonator structure with an aperture stop placed along its path results in the equivalent of a long beam path with plural powered optics and plural aperture stops periodically placed along its length. Such a structure causes the beam to converge on a stable mode, the so-called Eigen mode, as it builds over time. Spacing the aperture stop, which is the slab in the illustrative embodiment, away from the telescope allows the Eigen mode to be reached more quickly. A mechanical aperture stop can also be used, and may be preferred in certain applications. A thermal lensing compensator lens 36 may be located along the beam path 52 to compensate for thermal lensing that may occur within the gain medium 32.

The resonator cavity length is defined by the first porro prism 50 and a second pono prism 30. The first porro prism 50 is rotated 45° degrees about the optical line-of-sight 52 with respect to the slab 34 axes. This orientation causes a 90° rotation of the beam spatial profile on successive resonator passes. In this embodiment, a conventional polarization beam splitter 44 is used as the resonator out-coupler. Other out-coupling techniques may be used without departing from the spirit and scope of this invention. Out-coupling is enabled by activating an electro-optic switch 32. When activated, the switch rotates the beam polarization thereby allowing none, or a potion of, or all of the beam 46 to be out-coupled from the resonator. Note that a half-wave plate 48 is used to re-orient the beam polarization to be in alignment with the principal axes of the first porro prism 50.

The illustrative embodiment includes the combination of a high aspect ratio slab laser medium, an anamorphic telescope, and a porro, or Benson, prism rotated 45 degrees about the optical line-of-sight with respect to the slab axes. This assembly of conventional components provides two major advantages in laser resonator performance. First, the asymmetry in both the near field and far field beam profile associated with the aspect ratio of the slab is corrected by rotating the image of the beam by 90° on successive passes through the laser resonator. This produces a symmetrical beam profile and a very uniform beam quality along both slab axes. Second, high beam quality is achieved along both slab axes by forcing both beam directions to experience a low Fresnel number on alternate passes through the thin dimension of the slab or its associated limiting aperture.

There are several laser resonator applications where the present invention is particularly advantageous. The first is a short-pulse, high beam quality power oscillator. A short resonator length is typically required in a Q-switched system to minimize pulse buildup time. Conventional high aspect ratio slab lasers, however, require a long resonator length to maintain a low Fresnel number in the wide dimension of the slab. While intra-cavity telescopes can be used to reduce the effective aperture of the beam within the resonator, thereby reducing the Fresnel number, this places high peak optical intensity on the coated optical surfaces of the telescope, which can-damage these surfaces. The present invention uses an anamorphic telescope that does not appreciably change the peak beam intensity within the resonator cavity, while providing a low Fresnel number on alternate passes. Furthermore, achieving a low Fresnel number in the wide dimension of a conventional slab resonator reduces the Fresnel number in the narrow dimension to a very loss regime, where lasing action either would not occur or at best would be very inefficient.

A second illustrative embodiment of the present invention is a continuous wave ("CW") oscillator that includes a circular clear aperture, which is required in order to produce a symmetric spot in the far field. A symmetric spot is difficult to achieve in a high aspect ratio slab laser resonator due to the asymmetry in the slab. The teachings of the present invention correct this asymmetry by rotating the spatial profile of the beam on successive passes through the resonator. The result is a symmetric beam both in the near field, which is optimal for a circular clear aperture, as well as in the far field. Furthermore, a homogeneous beam quality is realized in both transverse directions.

Figure 5:
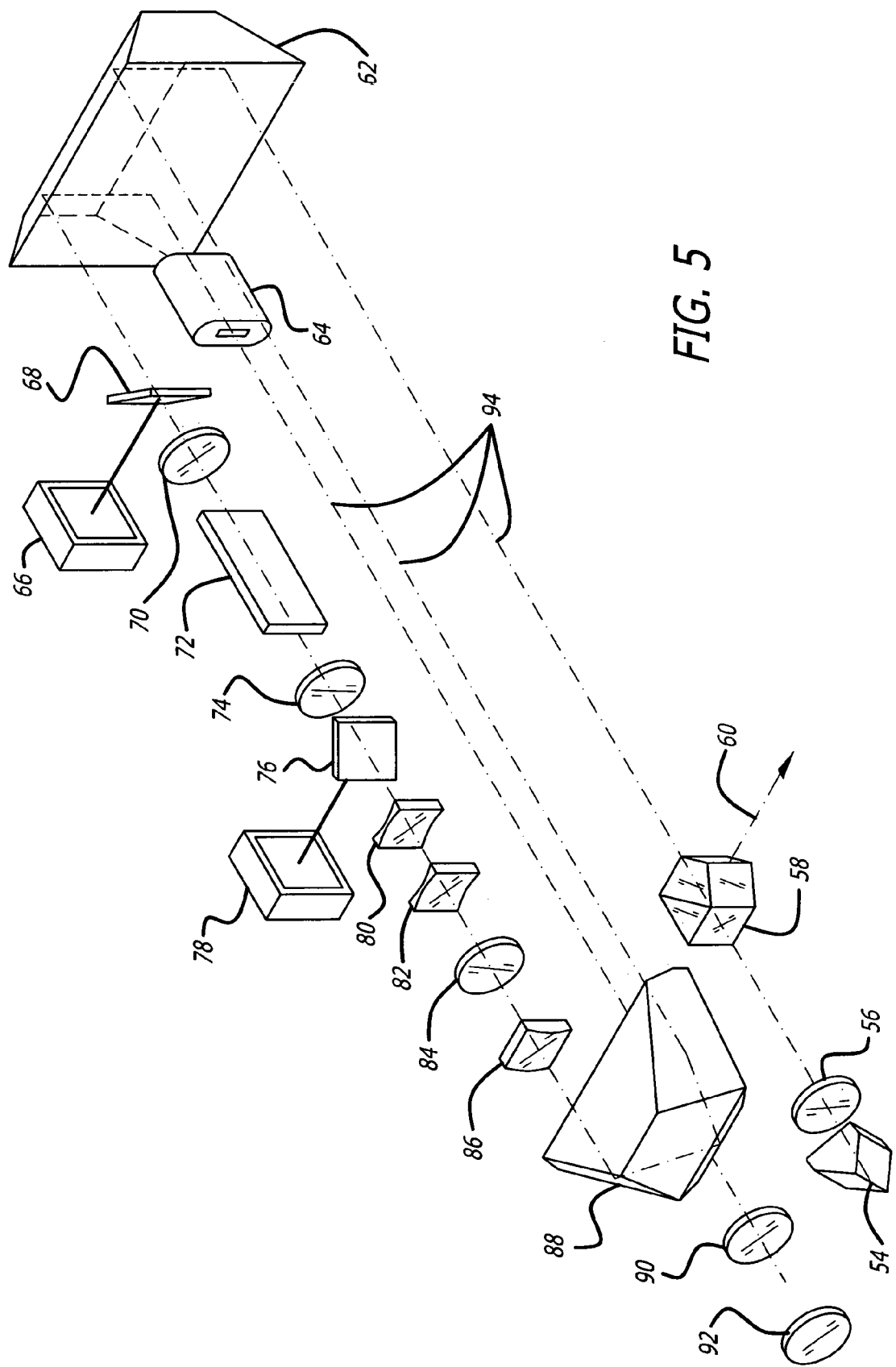
FIG. 5 is a perspective drawing of a short-pulse mode-locked and cavity dumped laser resonator according to an illustrative embodiment of the present invention.

Reference is directed to FIG. 5, which is a perspective drawing of a short-pulse mode-locked and cavity dumped laser resonator according to an illustrative embodiment of the present invention. FIG. 5 illustrates a short-pulse laser radar ("ladar") application of the present invention. A dual-mode electro-optic ("EO") switch 64 is used with a relatively long 4-fold resonator to achieve cavity dumping of a mode-locked waveform. The dual mode EQ switch 64 is driven by a voltage waveform that provides high holdoff during an initial period, which allows high gain to build in the laser medium without extraction. This period is followed by a sinewave-modulated high transmission period, which allows a single mode-locked pulse to build within the cavity. This is then followed by 100% output coupling, which allows the pulse to be extracted via the polarization out-coupler 60. A resonant reflector 90 is used to limit the number of longitudinal modes propagating in the resonator, which determines the made-locked pulse duration. Those skilled in the art will recognize that the pulse width roughly equals the cavity round-trip time divided by the number of longitudinal modes. The theory of operation of a mode-locked laser resonator is also known to those skilled in the art. The foregoing approach has several advantages over conventional Q-switching. First, very short pulse widths can be achieved with a relatively low-gain medium such as Yb:YAG. Second, the intra-cavity optical flux is only about 1.4 times that of the output flux, which results in lower optical damage and higher reliability of the resonator. Also, the short pulse duration is not dependent on a short round-trip propagation time within the cavity, and therefore a long cavity can be used to provide very good beam quality with a low Fresnel number. A long cavity is also advantageous in providing time to cavity dump the circulating mode-locked pulse.

In FIG. 5, the other components of the system are now described. The resonant cavity is terminated with a resonant reflector 90 and a wave plate 92 at a first end, and a porro prism 54 at a second end. The roof line of the porro prism 54 is rotated 45° with respect to the principal axes of the laser gain medium slab 72. A half-wave plate 56 is positioned along the beam path 44 near the porro prism 54 to correct beam polarization with respect to the out-coupling and Q-switch functions. The out-coupler 58 is a polarization type device that outputs a pulse of laser energy 60 when the EO switch 64 is activated by a suitable electrical waveform. The relatively long optical path 94 is folded into a four-pass path by a wide folding prism 62 and a section of a corner cube retro-reflector 88. An anamorphic telescope including lens elements 80, 82, 84, and 86 reshapes the beam profile to a symmetrical profile. A pair of diode pumplight arrays 78 and 66 end pumps the gain medium slab 72 through a pair of coated reflectors 76 and 68 respectively. Lens elements 74 and 70 couple the pumplight and laser beam in and out of the slab 72.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser resonator apparatus for generating a laser beam having beam quality along two transverse axes that is determined largely by the mode discrimination characteristics of one axis, comprising:

a slab lasing medium having a first and a second end for emitting a laser beam;

an aperture stop with a narrow transverse dimension and an orthogonal wide transverse dimension for defining a beam profile of said laser beam;

a first reflector aligned to reflect said laser beam emitted from said first end of said slab back therein, thereby defining a first end of a resonant cavity;

an anamorphic telescope having a first end aligned to receive said laser beam emitted from said second end of said slab, said telescope operable to reshape said laser beam profile to be substantially symmetrical about its transverse axes and to emit said reshaped laser beam from a second end of said telescope;

a second reflector aligned receive said reshaped laser beam, and operable to reflect said laser beam back into said second end of said telescope, thereby defining a second end of said resonant cavity; and a beam rotator disposed between said anamorphic telescope and said second reflector operable to rotate the beam profile of said reshaped laser beam by 90 degrees after two passes.

2. The apparatus of claim 1 wherein said first reflector is a porro prism, a Benson prism, a mirror, or a resonant reflector.

3. The apparatus of claim 1 wherein said second reflector is a porro prism having its roof-line rotated approximately 45° with respect to said narrow and wide transverse dimensions of said laser beam, thereby serving a dual function as said beam rotator.

4. The apparatus of claim 1 wherein said second reflector is a Benson prism having its roof-line rotated approximately 45° with respect to said narrow and wide transverse dimensions of said laser beam, thereby serving a dual function as said beam rotator.

5. The apparatus of claim 1 wherein said aperture stop is defined by the transverse dimensions of said slab.

6. The apparatus of claim 1 wherein said aperture stop is a mechanical aperture stop positioned along the path of said laser beam.

7. The apparatus of claim 1 wherein said aperture stop is positioned substantially closer to said first reflector than to said second reflector.

8. The apparatus of claim 1 wherein said telescope is positioned substantially closer to said second reflector than to said aperture stop.

9. The apparatus of claim 3 further comprising a half-wave plate positioned between said slab and said second reflector.

10. The apparatus of claim 1 further comprising an optical switch disposed within said resonator, said optical switch driven, to enable pulsed operation through Q-switching, longitudinal mode locking, or cavity dumping.

11. The apparatus of claim 10 wherein said optical switch is a voltage driven nonlinear electro-optical switch operated as a Pockels cell.

12. The apparatus of claim 1 wherein said slab is a solid-state lasing medium.

13. The apparatus of claim 12 wherein said solid-state medium is ytterbium ion doped yttrium-aluminum-garnet.

14. The apparatus of claim 1 further comprising an out-coupler.

15. The apparatus of claim 14 wherein said out-coupler is a polarization out-coupler or polarizer.

16. A laser resonator apparatus for generating a laser beam having beam quality along two transverse axes that is determined by the mode discrimination characteristics of one axis, comprising:

a high aspect ratio solid-state slab lasing medium having a first and a second end for emitting a laser beam, and having a narrow transverse dimension and an orthogonal wide transverse dimension for defining a beam profile of said laser beam;

a first reflector aligned to reflect said laser beam emitted from said first end of said slab back therein, thereby defining a first end of a resonant cavity;

an anamorphic telescope having a first end aligned to receive said laser beam emitted from said second end of said slab, said telescope operable to reshape said laser beam profile to be substantially symmetrical about its transverse axes and to emit said reshaped laser beam from a second end of said telescope;

a porro prism, having its roof-line rotated approximately 45° with respect to said narrow and wide transverse dimensions of said laser beam, and aligned to receive said reshaped laser beam, rotate the beam profile of said reshaped laser beam by 90°, and to reflect said laser beam back into said second end of said telescope, thereby defining a second end of said resonant cavity;

a half-wave plate positioned between said slab and a second reflector and aligned to compensate the polarization rotation caused by said porro prism;

a polarization out-coupler aligned along the path of said laser beam; and an electro-optic switch positioned along the path of said laser beam and operable to rotate the polarization of said laser beam by 90° upon activation thereof; thereby causing said out-coupler to out-couple a portion of said laser beam, from the laser resonator apparatus.

17. A method of generating a laser beam having beam quality along two transverse axes that is largely determined by the mode discrimination characteristics of one axis, in a laser resonator having a slab lasing medium, an aperture stop, a first reflector aligned with a first end of the slab, an anamorphic telescope aligned with a second end of the slab, a second reflector aligned with the telescope opposite of the slab and a beam rotator disposed between the anamorphic telescope and the second reflector, the method comprising the steps of:

stimulating emission of a laser beam from the ends of the slab;

limiting a profile of the laser beam by a narrow transverse dimension and an orthogonal wide transverse dimension of the aperture stop;

reflecting, by the first reflector, the laser beam emitted from the first end of the slab back therein, thereby defining a first end of a resonant cavity;

reshaping the laser beam profile, by the telescope, to be substantially symmetrical about its transverse axes;

rotating the beam profile of the reshaped laser beam by approximately 90°, by the beam rotator; and reflecting the reshaped laser beam back into the telescope, by the second reflector, thereby defining a second end of said resonant cavity.

18. The method of claim 17 wherein the second reflector is a roof prism having its roof-line rotated approximately 45° with respect to the narrow and wide transverse dimensions of the laser beam, thereby serving a dual function as said beam rotator.

19. The method of claim 17 wherein the second reflector is a porro prism having its roof-line rotated approximately 45° with respect to the narrow and wide transverse dimensions of the laser beam, thereby serving a dual function as said beam rotator.

20. The method of claim 17 wherein the second reflector is a Benson prism having its roof-line rotated approximately 45° with respect to the narrow and wide transverse dimensions of the laser beam, thereby serving a dual function as said beam rotator.

21. The method of claim 17 wherein the aperture stop is defined by the transverse dimensions of the slab.

22. The method of claim 17 wherein the aperture stop is a mechanical aperture stop positioned along the path of the laser beam.

23. The method of claim 17 further comprising the step of positioning the aperture stop substantially closer to the first reflector than to the second reflector.

24. The method of claim 17 further comprising the step of positioning the telescope substantially closer to the second reflector than to the aperture stop.

25. The method of claim 19 further comprising the step of compensating the polarization rotation caused by said porro prism at a position between the anamorphic telescope and the second reflector.

26. The method of claim 17 further comprising the steps of Q-switching, longitudinal mode locking, or cavity dumping by means of an optical switch to produce a pulsed output beam.

27. The method of claim 26 wherein said optical switch is a voltage driven nonlinear electro-optical switch operated as a Pockels cell.

28. The method of claim 17 wherein said slab is a solid-state lasing medium.

29. The method of claim 17 further comprising the step of out-coupling a portion of laser beam from the laser resonator.

30. The method of claim 29 wherein said out-coupling step is accomplished with a polarization out-coupler or polarizer.

* * * * *